US012791816B2

(12) United States Patent
Ohodnicki et al.

(10) Patent No.: US 12,791,816 B2
(45) Date of Patent: Nov. 10, 2026

(54) APPARATUS AND METHOD FOR INSTALLING CABLES, SUCH AS FIBER OPTIC CABLES INCLUDING ASSOCIATED SENSORS, IN TUBULAR STRUCTURES SUCH AS A PIPELINES

(71) Applicants: UNIVERSITY OF PITTSBURGH—OF THE COMMONWEALTH SYSTEM OF HIGHER EDUCATION, Pittsburgh, PA (US); BRAINDRIP, LLC, Jacksonville, FL (US)

(72) Inventors: Paul R. Ohodnicki, Allison Park, PA (US); Kent Weisenberg, Jacksonville, FL (US); Ibrahiim Syed, Jacksonville, FL (US)

(73) Assignees: University of Pittsburgh—Of the Commonwealth System of Higher Education, Pittsburgh, PA (US); BrainDrip, LLC, Jacksonville, FL (US)

(*) Notice: Subject to any disclaimer, the term of this patent is extended or adjusted under 35 U.S.C. 154(b) by 257 days.

(21) Appl. No.: 18/568,463

(22) PCT Filed: Aug. 12, 2022

(86) PCT No.: PCT/US2022/040175
§ 371 (c)(1),
(2) Date: Dec. 8, 2023

(87) PCT Pub. No.: WO2023/064030
PCT Pub. Date: Apr. 20, 2023

(65) Prior Publication Data

US 2024/0272397 A1 Aug. 15, 2024

Related U.S. Application Data

(60) Provisional application No. 63/262,411, filed on Oct. 12, 2021.

(51) Int. Cl.
*H02G 1/02* (2006.01)
*B08B 9/051* (2006.01)
(Continued)

(52) U.S. Cl.
CPC .............. *G02B 6/502* (2013.01); *B08B 9/051* (2013.01); *G02B 6/54* (2013.01); *H02G 1/088* (2013.01)

(58) Field of Classification Search
CPC .......... H02G 1/088; H02G 1/08; H02G 1/086; H02G 1/1256; H02G 8/00; G02B 6/502; G02B 6/54; G02B 6/50
See application file for complete search history.

(56) References Cited

U.S. PATENT DOCUMENTS 5,879,109 A 3/1999 Finzel et al.
5,950,298 A * 9/1999 Griffioen .................. H02G 1/08 29/241

(Continued)

FOREIGN PATENT DOCUMENTS

| | | | |
|---|---|---|---|
| CN | 111614014 | A | 9/2020 |
| EP | 1394589 | A1 | 3/2004 |
| JP | H03183310 | A | 8/1991 |
| JP | 3003987 | B2 | 1/2000 |
| WO | 02/056080 | A1 | 7/2002 |
| WO | 2002082151 | A1 | 10/2002 |
| WO | 2014068308 | A1 | 5/2014 |

*Primary Examiner* — Lee D Wilson
(74) *Attorney, Agent, or Firm* — Philip E. Levy; Eckert Seamans Cherin & Mellott, LLC

(57) ABSTRACT

A cable installation apparatus includes a drive assembly and a cable assembly, wherein the apparatus dispenses the cable onto and/or into and along the inner surface of a tubular structure while being moved. The apparatus also includes a securing assembly for holding and dispensing a securing material component while the apparatus is being moved along the length of the tubular structure, wherein the securing material component secures the cable to the inner surface of the tubular structure after being dispensed from the apparatus. A cleaning assembly may also be included for cleaning portions of the inner surface of the tubular structure
(Continued)

while the apparatus is being moved along the length of the tubular structure and before the cable is dispensed onto and/or into the portions of the inner surface of the tubular structure.

40 Claims, 10 Drawing Sheets

(51) Int. Cl.

| | |
|---|---|
| ***G02B 6/50*** | (2006.01) |
| ***G02B 6/54*** | (2006.01) |
| ***H02G 1/08*** | (2006.01) |

(56) References Cited

U.S. PATENT DOCUMENTS

| | | | | |
|---|---|---|---|---|
| 6,887,014 | B2 | 5/2005 | Holland | |
| 12,107,399 | B2 * | 10/2024 | Fiorentini | H02G 1/08 |
| 12,401,176 | B2 * | 8/2025 | MacDonald | B66D 1/12 |
| 12,455,251 | B2 * | 10/2025 | Rosen | B08B 9/0551 |
| 2002/0102136 | A1 | 8/2002 | Holland | |
| 2015/0355107 | A1 | 12/2015 | Paulson | |
| 2018/0191141 | A1 * | 7/2018 | Schmidt | H02G 1/085 |
| 2019/0196131 | A1 | 6/2019 | Turner | |
| 2022/0329053 | A1 * | 10/2022 | Fiorentini | H02G 1/08 |
| 2024/0272397 | A1 * | 8/2024 | Ohodnicki | G02B 6/502 |

* cited by examiner

APPARATUS AND METHOD FOR INSTALLING CABLES, SUCH AS FIBER OPTIC CABLES INCLUDING ASSOCIATED SENSORS, IN TUBULAR STRUCTURES SUCH AS A PIPELINES

CROSS-REFERENCE TO RELATED APPLICATION

This patent application is a U.S. National Phase of International Application No. PCT/US2022/040175, filed on Aug. 12, 2022, which claims priority under 35 U.S.C. § 119(e) from U.S. provisional patent application No. 63/262,411, filed on Oct. 12, 2021, the contents of which are incorporated herein by reference.

STATEMENT OF GOVERNMENT INTEREST

This invention was made with government support under grant #DE-AR0001332 awarded by the Department of Energy (DOE). The government has certain rights in the invention.

FIELD OF THE INVENTION

The present invention pertains to the installation of cables, such as, without limitation, fiber optic cables or other wires that include associated sensors, and, in particular, to an automatic, self-propelled apparatus and method for installing and embedding such cables in tubular structures, such as pipelines.

BACKGROUND OF THE INVENTION

As the world's pipeline infrastructure ages, it becomes an increasingly higher risk to both environmental and human safety. Conversely, the capability to build new pipelines or replace existing pipelines continues to diminish through new governmental legislation and regulations. For example, the Gas Modernization Act encompasses many regulations and fundamentally requires that owners and operators shall provide defect classification and leak monitoring of both their new and existing pipeline infrastructures.

Currently, for existing pipelines, there are two methods for pipeline owners and operators to meet these regulations. The first method is to renew or rehabilitate the pipeline with a liner system wherein the installed liner has embedded sensing wires or fibers within in the material construct. This method is exceedingly expensive and disruptive, and often the pipelines do not need to be structurally remediated as a part of installing the required sensing and monitoring systems. The second method is to dig up buried pipelines to expose the exterior of the pipe and then install sensor wires or fibers along or around the pipeline. This method is not only expensive and time consuming, but also disruptive to consumers, businesses, landowners as well as destructive to the environment.

Moreover, optical fiber sensing has recently emerged as an attractive technology for spatially and temporally distributed monitoring of various types of infrastructure, including pipelines. More specifically, distributed temperature, acoustic, strain, and even vibration monitoring can provide for unique information that helps to monitor operational processes in real-time or to identify early signatures of impending faults or failures. In the case of pipelines and related tubular structures, existing commercial fiber optic sensors are deployed external on the surface or in close proximity, which limits the value of information that can be derived. In addition, exterior installation of retrofitted sensor technologies suffers from the limitations described immediately above.

There is thus a need for an improved apparatus and method for installing and embedding such cables in tubular structures, such as pipelines.

SUMMARY OF THE INVENTION

In one embodiment, an apparatus for installing a cable within a tubular structure is provided. The apparatus includes a drive assembly structured and configured to move the apparatus along a length of the tubular structure, and a cable assembly coupled to the drive assembly, the cable assembly being structured and configured to hold the cable, wherein the apparatus is structured and configured to dispense the cable from the apparatus and onto and along an inner surface of the tubular structure while the apparatus is being moved along the length of the tubular structure. The apparatus also includes a securing assembly coupled to the drive assembly, the securing assembly being structured and configured to hold a securing material component, wherein the apparatus is structured and configured to dispense the securing material component from the apparatus while the apparatus is being moved along the length of the tubular structure, and wherein the securing material component is structured and configured to secure the cable to the inner surface of the tubular structure after being dispensed from the apparatus. The apparatus may further include a cleaning assembly coupled to the cable assembly and the securing assembly, the cleaning assembly being structured and configured to clean portions of the inner surface of the tubular structure while the apparatus is being moved along the length of the tubular structure and before the cable is dispensed onto the portions of the inner surface of the tubular structure.

In another embodiment, a method of installing a cable within a tubular structure is provided. The method includes providing a self-propelled deployment apparatus, wherein the deployment apparatus is structured and configured to: (i) move along a length of the tubular structure, (ii) hold and dispense the cable, (iii) hold and dispense a securing material component. The method may further include cleaning portions of the inner surface of the tubular structure using the deployment apparatus while the deployment apparatus is moving along the length of the tubular structure and before the cable is dispensed onto the portions of the inner surface of the tubular structure. In the non-limiting exemplary embodiment, the method still further includes, after the cleaning is performed, dispensing the cable from the deployment apparatus and onto and along the portions of the inner surface of the tubular structure while the deployment apparatus is moving along the length of the tubular structure, and after the dispensing of the cable from the deployment apparatus, dispensing the securing material component from the deployment apparatus while the deployment apparatus is moving along the length of the tubular structure. The dispended securing material component is structured and configured to secure the cable to the portions of the inner surface of the tubular structure.

In one particular exemplary embodiment, the securing material component is an adhesive tape. As described in detail herein, however, other securing materials may be used instead of or in addition to the adhesive tape to secure cable to the portions of the inner surface of the tubular structure. Such additional materials may include various adhesives, such as an epoxy, a resin, a urethane or polyurethane (e.g., an anti-corrosion and/or abrasion resistant epoxy, resin, polyurethane, urethane or polyurea) deposited using suitable methods such as spray-based deposition.

BRIEF DESCRIPTION OF THE DRAWINGS

A full understanding of the invention can be gained from the following description of the preferred embodiments when read in conjunction with the accompanying drawings in which.

DETAILED DESCRIPTION

Figure 1:
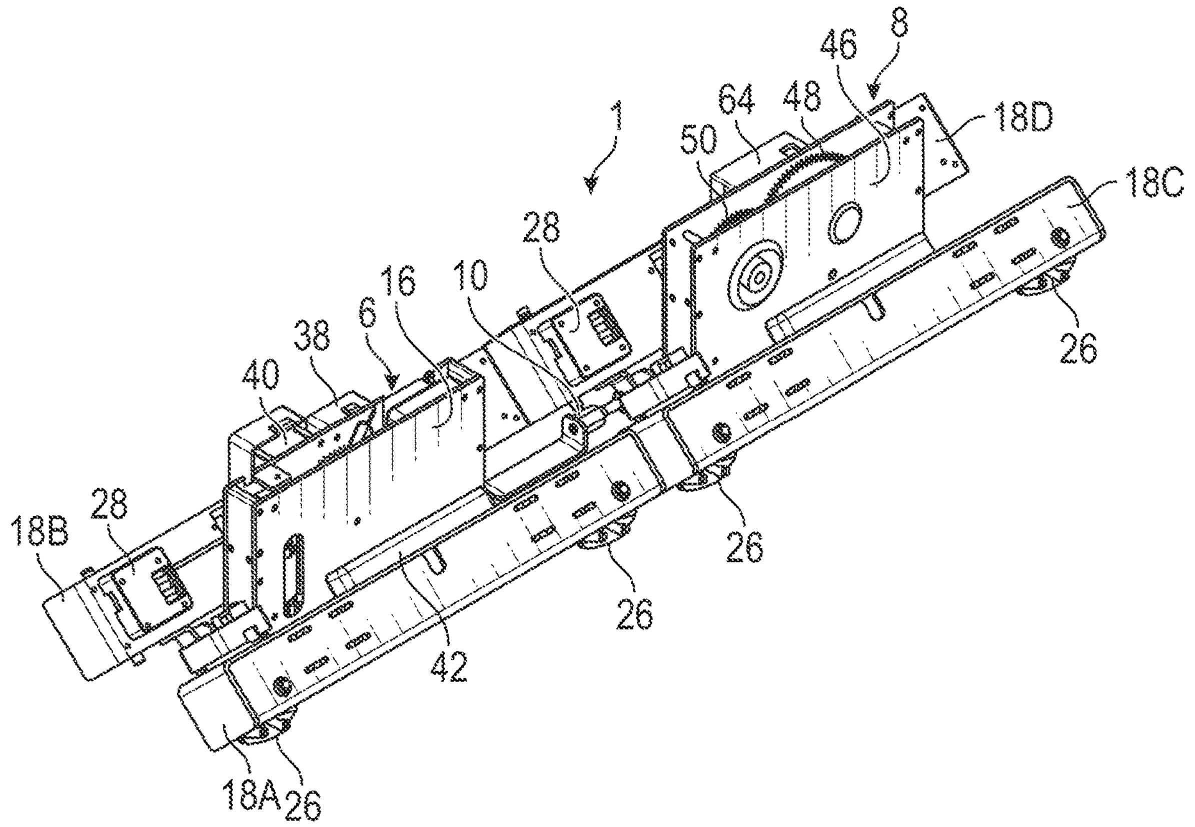
FIG. 1 is an isometric view and FIG. 2 is a cross-sectional view of a cable deployment tool according to one non-limiting, exemplary embodiment of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, the term "directly coupled" means that two elements are directly in contact with each other.

As used herein, the statement that two or more parts or components "engage" one another shall mean that the parts exert a force against one another either directly or through one or more intermediate parts or components.

As used herein, the term "number" shall mean one or an integer greater than one (i.e., a plurality).

As used herein, the term "controller" shall mean a programmable analog and/or digital device (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer and can be volatile memory or nonvolatile memory.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject innovation. It will be evident, however, that the disclosed concept can be practiced without these specific details without departing from the spirit and scope of this innovation.

The disclosed concept, as described herein, relates, in one or more exemplary embodiments, to a deployment tool design, device and methodology for the installation and embedment of cables, such as sensor wires, sensor tapes and other communication and feedback conduits, within tubular structures, such as pipelines. The disclosed concept further relates to a self-contained, semi-autonomous robotic device which can self-propel in a range of pipe diameters to install cables/wires (e.g., a fiber optic cable), including those having associated sensors forming a part thereof which can be used for advanced sensing and interrogation.

The disclosed concept further relates to the storage and utilization of a securing material component, such as, without limitation, metallic or filament reinforced or resin impregnated tape, to embed the cable on to a portion, such as the invert, of the tubular structure (e.g., pipe) wall, which will act as a protective layer and keep the cable, and any associated sensor(s), protected during various conditions, such as supersonic particle deposition, thermal spraying, spraying of applied coatings, the deployment of pull in place and/or cured in place liner installations, as well as during pipe cleaning, pigging and inspection processes. The disclosed concept, in further exemplary embodiments, may, alternatively, utilize two component fast set material or UV activated material, instead of tape, to embed the cable into or onto the to the surface of the tubular structure.

As described herein, the disclosed concept, in various exemplary embodiments, further relates to the design of self-powered drive units utilizing Mecanum or omni wheels for navigating through the tubular structure. Thus, it will be understood that tool of the disclosed concept can apply the fiber to other parts of the tubular structure, such as the crown or any axis thereof. In particular, in one exemplary embodiment described herein, the tool includes Mecanum wheels that are independently controlled so that the cable could be installed in a long spiral/helix in the tubular structure for better resolution, and the tool is also controllable/steerable so that service connections to or tees in the tubular structure or other profile, such as temperature or pressure sensors, probes, etc., can be avoided by the path of the fiber. In these embodiments, the drive units are coupled with the base unit which houses end-effectors, a controller, a number of wireless cameras, lights, and/or other sensors to make it a self-contained unit. In one particular embodiment, wireless camera(s) are integrated with a microcontroller of the tool and provide a live data feed to the operator. Moreover, a provided wireless interface may establish data communication, which helps to send and receive commands in real time.

In certain aspects, the disclosed concept, as described herein, also further relates to the spiral or helical installation of cables to acquire more data by covering greater surface area. Integration of an inclinometer with the independent motor controls of the tool of the disclosed concept makes it possible to traverse the tool to follow a straight line, spiral or any predetermined path. In certain other aspects, the disclosed concept also further relates to the design and utilization of adjustable joints to fit the tool in a wide range of tubular structure (e.g., pipe) diameters. Mechanisms, such as springs and suspensions, on the end effectors of the tool ensure that constant tension is applied to the cable and securing material components (e.g., tape), even while the tool is traversing over offsets and joints.

In still other aspects, the disclosed concept, as described herein, also further relates to a cleaner and blower mechanism to clean the surface of the tubular structure ahead of applying the securing material component, such as a tape, to maximize the adhesion of the securing material component to the tubular structure substrate. In certain exemplary embodiments, the disclosed concept provides a high-speed motor coupled with a wire brush mounted on a suspension system that cleans any dirt from the surface of the tubular structure. In addition, in such exemplary embodiments, the wire brush is followed with a powerful blower, which clears the path further by blowing away the abraded dust and dirt.

The disclosed concept even further relates to the design and utilization of a storage spool for the cable, coupled with a ratcheting mechanism to prevent over spooling and hence maintaining the desired tension on the wire during installation. The disclosed concept, in certain exemplary embodiments, still further relates to the utilization of a train of multiple units to overcome the limitation of storage of tape or sensor wire due to the dimensional constraints of lesser pipe diameters. An axial spooling mechanism can also be used to overcome this particular limitation.

Thus, in short, the disclosed concept provides a robust, scalable, and economically viable pathway towards internal installation of cables, such as fiber optic cables and associated sensors, in pipelines and other tubular structures, through a robotic deployment tool and strategy that is described in greater detail herein. The tool is capable of integrating optical fibers within existing pipelines and other tubular structures, as well as in newly installed systems. The technique is broadly applicable and enables installation of a wide range of cables, such as fiber optic cables and sensors, including protective packaging as well as liners and coatings for pipeline interiors.

Figure 2:
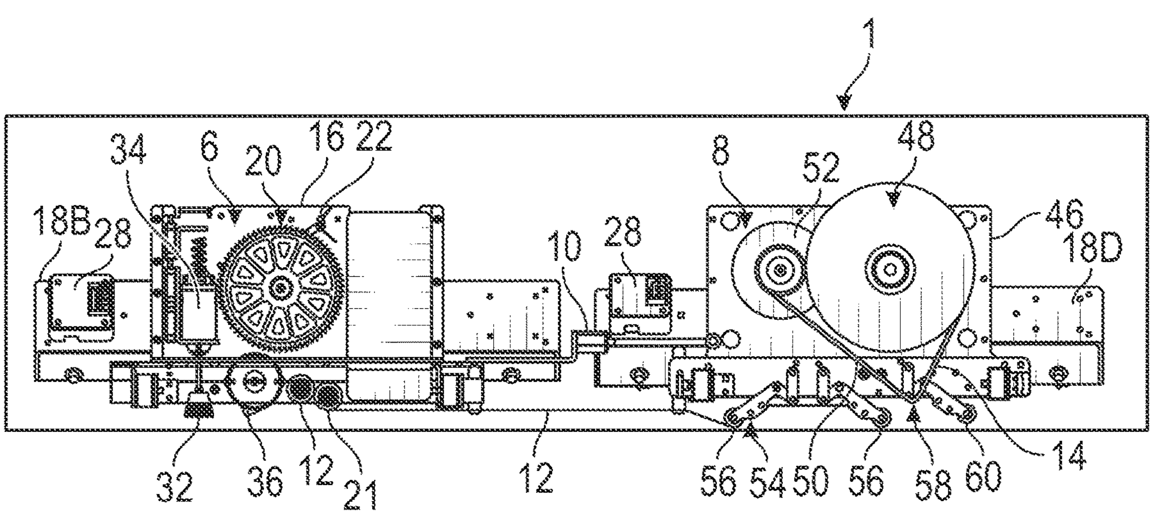
Figure 3:
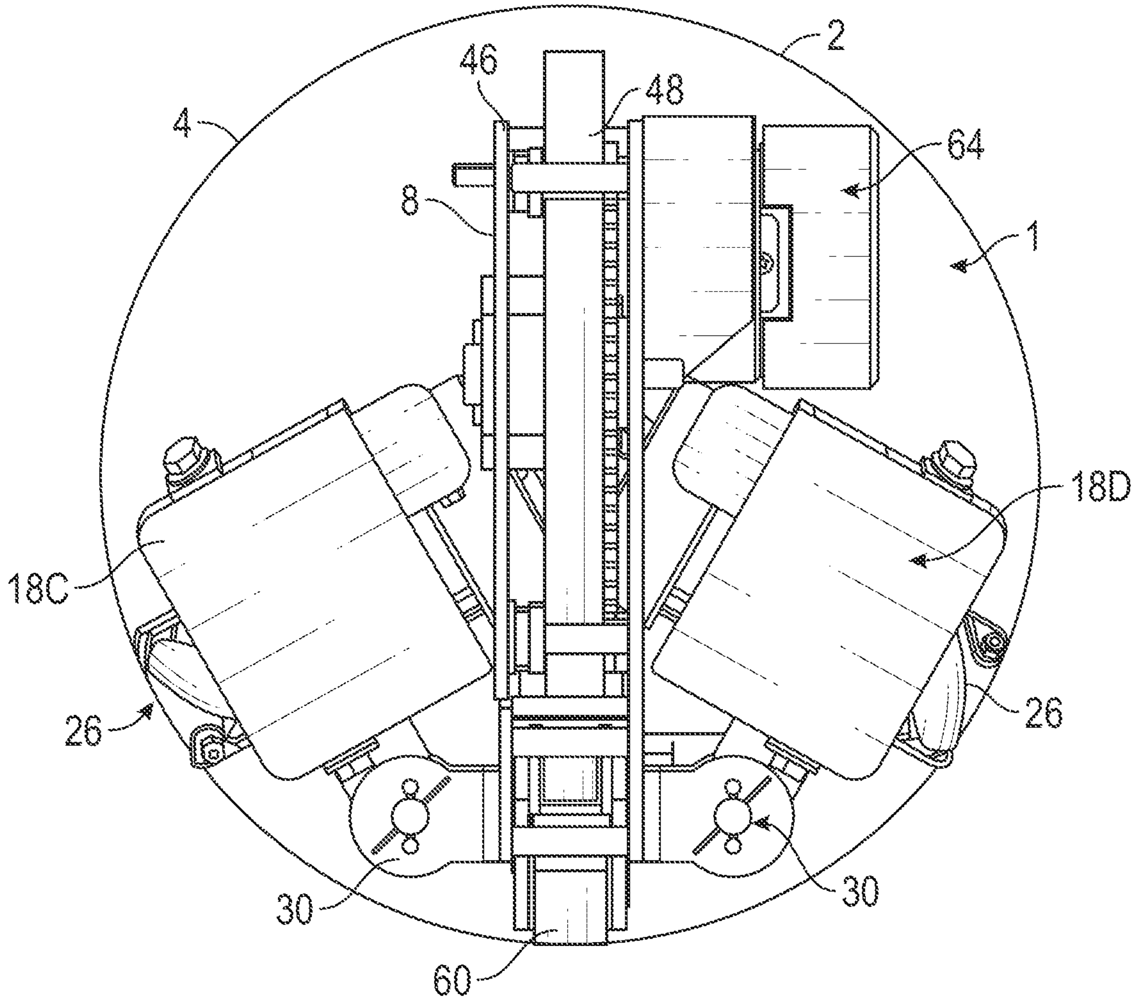
FIG. 3 is a rear view of the cable deployment tool of FIGS. 1 and 2 as deployed during operation within an exemplary pipeline.

FIG. 1 is an isometric view and FIG. 2 is a cross-sectional view of a cable deployment tool 1 according to one non-limiting, exemplary embodiment of the disclosed concept. FIG. 3 is a rear view of the cable deployment tool 1 of FIGS. 1 and 2 as deployed during operation within an exemplary pipeline 2 having a pipe wall 4. It will be understood, however, that the depiction of cable deployment tool one in the figures and the accompanying description is meant to be exemplary only, and that other configurations of cable deployment tools are also possible and contemplated within the scope of the disclosed concept.

As described in more detail herein, cable deployment tool 1 is a self-propelled device that is structured to move along the length of pipe wall 4, and while doing so, dispense a fiber optic cable and secure that fiber-optic cable to the inner surface of the pipe wall 4 by way of a securing material component such as an adhesive tape. More specifically, cable deployment tool 1 of the present non-limiting exemplary embodiment includes a fiber unit 6 that is selectively coupled to a tape unit 8 by way of a flex coupling assembly 10. Fiber unit 6 is structured and configured to hold a fiber optic cable 12 that, in the exemplary embodiment, includes a number of associated, embedded sensors. Tape unit 8 is structured and configured to hold a metallic tape 14 that, as described elsewhere herein, is structured and configured to secure fiber-optic cable 12 to the interior of pipe wall 4 after being dispensed from cable deployment tool 1.

As described in greater detail herein, each of fiber unit 6 and tape unit 8 includes a driving assembly for selectively and remotely moving the cable deployment tool 1 along the length of the pipe wall 4 as fiber-optic cable 12 is being dispensed and secured in place by way of the dispensed metallic tape 14. The structure and functionality of the fiber unit 6 and the tape unit 8 of the present non-limiting, exemplary embodiment are each described in greater detail below.

Figure 4:
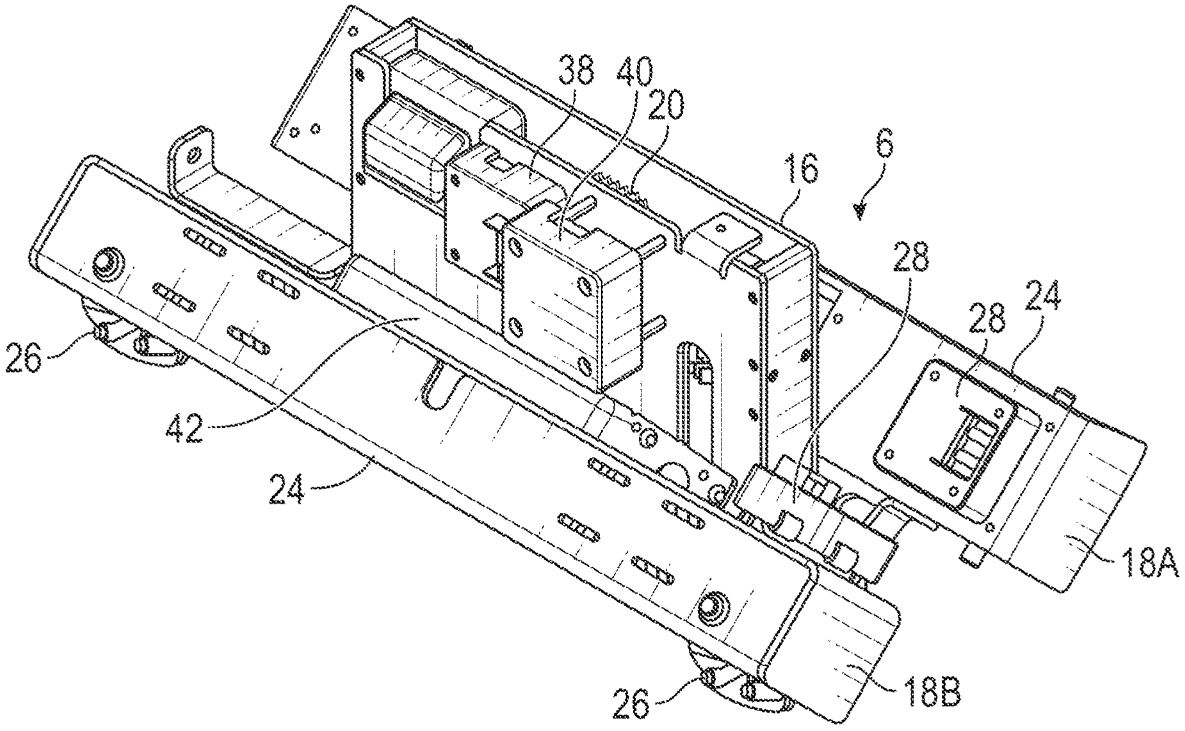
FIG. 4 is an isometric view.
Figure 5:
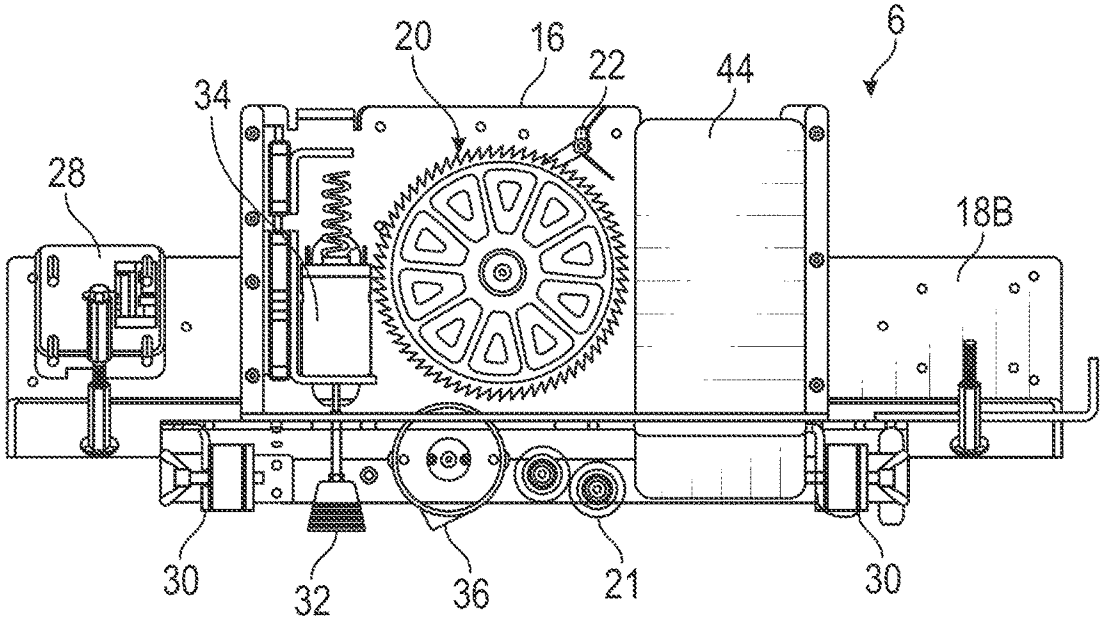
FIG. 5 is a cross-sectional view of a fiber unit according to one non-limiting exemplary embodiment of the disclosed concept.

FIG. 4 is an isometric view and FIG. 5 is a cross-sectional view of fiber unit 6 according to this non-limiting exemplary embodiment. As seen in FIGS. 2, 4 and 5, fiber unit 6 includes a housing member 16 having attached thereto on opposite sides thereof a first drive unit 18A and a second drive unit 18B, each of which forms a part of the drive assembly for selectively and will automatically moving cable deployment tool 1 along the length of pipeline 2. Housing member 16 also includes a fiber spool 20 that is structured and configured to hold fiber-optic cable 12 prior to being dispensed from cable deployment tool 1. A ratchet mechanism 22 is provided for controlling the rotation of fiber spool 20 during the dispensing of fiber-optic cable 12. Also, fiber unit 6 includes a plurality of guiding rollers 21 for receiving and guiding the fiber-optic cable 12 as it is released from fiber spool 20. The destination and ultimate dispensing point of fiber-optic cable 12 once passing over the guiding rollers 21 is described elsewhere herein in connection with the tape unit 8.

Each of drive unit 18A and 18B includes a housing member 24 that holds first and Second Mecanum wheels 26. In each drive unit 18, the mechanism wheels 26 are driven by an associated motor that is provided within housing member 24 and driven by an associated motor driver 28. In addition, each drive unit 18 is coupled to housing member 16 by way of respective adjustable brackets in the form of Hirth joints 30. Hirth joints 30 allow for the selective adjustment (pivoting) of the drive unit 18 with respect to housing member 16 in order to enable fiber unit 6 to be deployed within pipelines 2 having varying internal diameters. In the non-limiting exemplary embodiment, Hirth joints 30 are adjustable to accommodate 8-to-12-inch pipe diameters, although it understood that this is meant to be exemplary only and that this may be expanded to accommodate even greater diameters.

In addition, housing member 16 further houses and holds (i) a wire brush 32 that is driven by a high-speed cleaner motor 34, and (ii) a blower 36 that is structured to generate a flow of gas and dispense that flow therefrom. As described elsewhere herein, wire brush 32 and blower 36 form part of a cleaning assembly that is structured to clean portions of the inner surface of pipe wall 4 while cable deployment tool 1 is being moved along the length of pipeline 2 and before the fiber-optic cable 12 is dispensed onto and secured to the pipe wall 4. More specifically, wire brush 32 is driven by high-speed cleaner motor 34 and comprises an abrading member that is structured and configured to abrade material such as dust and dirt from the inner surface of pipe wall 4 as cable deployment tool 1 is being moved along the length of pipeline 2. Blower 36 is structured and configured to generate and dispense a flow of gas that blows the abraded material away from the path of cable deployment tool 1. As seen in FIG. 4, a motor driver 38 is coupled to housing member 16 and drives the operation of high-speed cleaner motor 34. Similarly, a motor driver 40 is coupled to housing member 16 and drives the operation of blower 36.

In addition, fiber unit 6 includes a first rechargeable battery 42 and a second rechargeable battery 44. The first rechargeable battery 42 is provided for powering up the drive units and its components such as motors, motor drivers, and can also be used to power lights, cameras, in other embodiments. The second rechargeable battery 44 is provided for powering the components which are on the housing of fiber unit 6, such as the cleaner motor, blower, and respective motor drivers and/or any other sensors.

Figure 6:
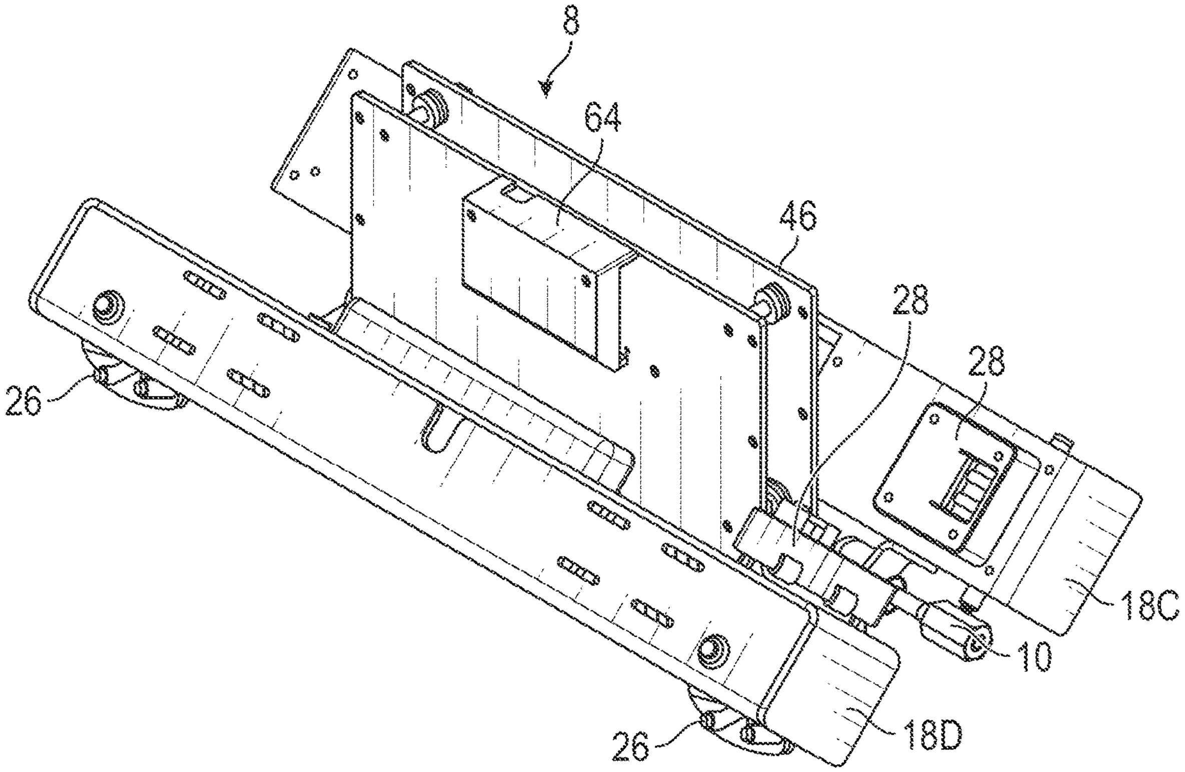
FIG. 6 is an isometric view.
Figure 7:
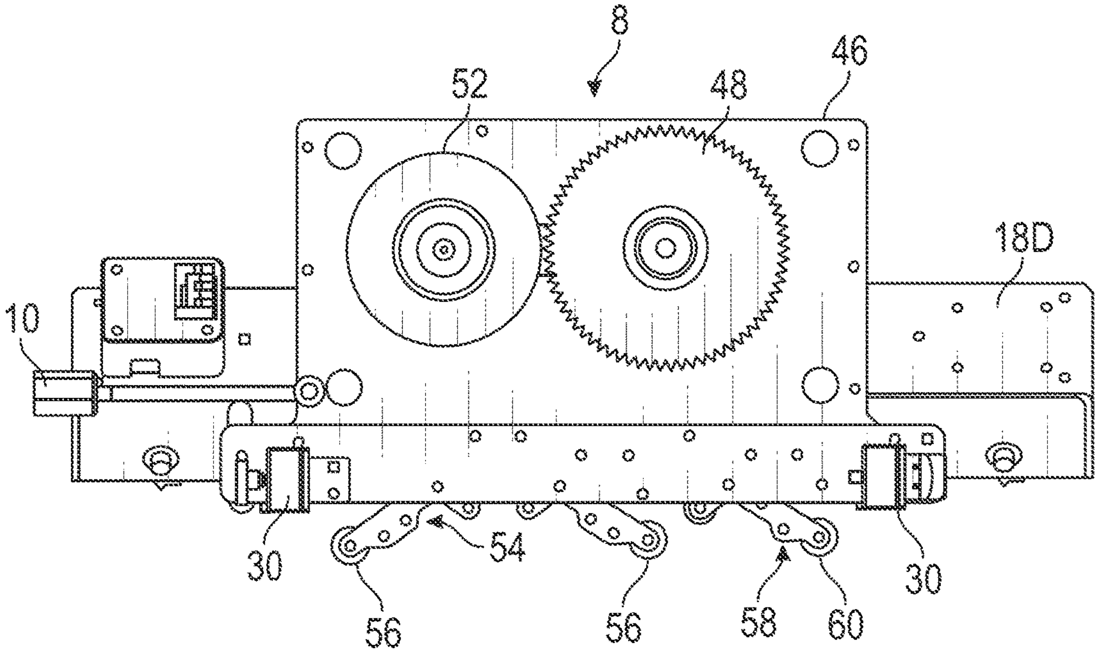
FIG. 7 is a cross-sectional view of a tape unit according to one non-limiting exemplary embodiment of the disclosed concept.

FIG. 6 is an isometric view and FIG. 7 is a cross-sectional view of tape unit 8 according to this exemplary embodiment. As seen in FIGS. 2, 6 and 7, tape unit 8 includes a housing member 46 having attached thereto on opposite sides thereof a first drive unit 18C and a second drive unit 18D, each of which forms a part of the drive assembly for moving cable deployment tool 1 along the length of pipeline 2. Housing member 46 includes a tape holder/spool 48 that is structured and configured to hold tape 14 (including the release liner 50 thereof (FIG. 2)) prior to being dispensed from cable deployment tool 1. Housing member 46 also includes a release liner spool/collector 52 that is structured and configured to collect and hold release liner 50 after being dispensed from cable deployment tool 1 and being separated from the reminder of tape 14 as described herein.

Furthermore, tape unit 8 includes a fiber applicator link 54 having a plurality of effectors or rollers 56, and a tape applicator link 58 having a plurality of effectors or rollers 60. As seen in FIG. 2, fiber applicator link 54 is structured and configured to receive fiber-optic cable 12 from guiding rollers 21 of fiber unit 6 after being dispensed from fiber spool 20 and deposit the received fiber-optic cable 12 onto pipe wall 4 of pipeline 2. As also seen in FIG. 2, tape applicator link 58 is structured to receive tape 14 from tape spool 48, separate the release liner 50 from the remainder of tape 14, deposit the remainder of tape 14 onto the dispensed fiber-optic cable 12, and collect and feed release liner 50 to release liner collector 52 for storage thereby.

Drive units 18C and 18D are similar to drive units 18A and 18B described in connection with fiber unit 6, and each includes a housing member 24 that holds first and second Mecanum wheels 26. As described elsewhere herein, in each drive unit 18, the mechanism wheels 26 are driven by an associated motor that is provided within housing member 24 and driven by an associated motor driver 28. In addition, as was the case with fiber unit 6, each drive unit 18 of tape unit 8 is coupled to housing member 46 by way of respective adjustable brackets in the form of Hirth joints 30. As noted elsewhere herein, Hirth joints 30 allow for the selective adjustment (pivoting) of the drive unit 18 with respect to housing member 46 in order to enable tape unit 8 be deployed within pipelines 2 having varying internal diameters.

Finally, housing member 46 of tape unit 8 is provided with and holds a controller 64. Controller 64 is provided with a number of computer executable instructions/routines for automatically controlling operation of cable deployment tool 1 and each of the various parts and components thereof as described in detail herein. In other words, controller 64 provides overall control for the operation of cable deployment tool 1 during use.

In operation, cable deployment tool 1 is inserted into the open end of pipeline number 2, and Hirth joints 30 are adjusted so as to cause all of the mechanism wheels 26 to engage the inner surface of pipe wall 4. At the same time, rollers 60 and wire brush 32 will engage the invert (i.e., bottom center) of pipeline 2 (rollers 56 will also engage the invert). Next, cable deployment tool 1 is, under the control of controller 64, moved along the length of pipeline 2 by operation of the drive assembly including the drive units 18. In particular, Mecanum wheels 26 are driven by the respective motors and thereby cause cable deployment tool 1 to move along the length of pipeline 2. Because each Mecanum wheel is individually controllable by way of its associated motor, drive unit 18, and ultimately controller 64, cable deployment tool 1 may be moved along the length of pipeline 2 in a number of various manners, including being moved axially and/or helically. In addition, as cable deployment tool is so moved, the cleaning assembly comprising wire brush 32 and blower 36 are activated under control of the associated driver units 38 and 40 and controller 64 to clean the portion of pipeline 2 on to which fiber-optic cable 12 is to be deposited and embedded by abrading away material such as dust or dirt using brush 32 and blowing that abraded material away and out of the path using blower 36. While cable deployment tool 1 is being moved in this manner, and after the cleaning as just described, fiber unit 6 and tape unit 8 are each controlled by controller 64 to (i) cause the fiber-optic cable 12 to be released from fiber spool 12, rollers 21, and thereafter into fiber applicator link 54, from which it is then deposited onto the cleaned portions of the inner surface of pipeline 2, and (ii) cause tape 14 to be released by tape spool 48, fed to tape applicator link 60, and ultimately be deposited on top of the dispensed fiber-optic cable 12 to secure fiber-optic cable 12 to the inner surface of pipe wall 4 after having had the release liner 50 removed therefrom as described herein.

Figure 8:
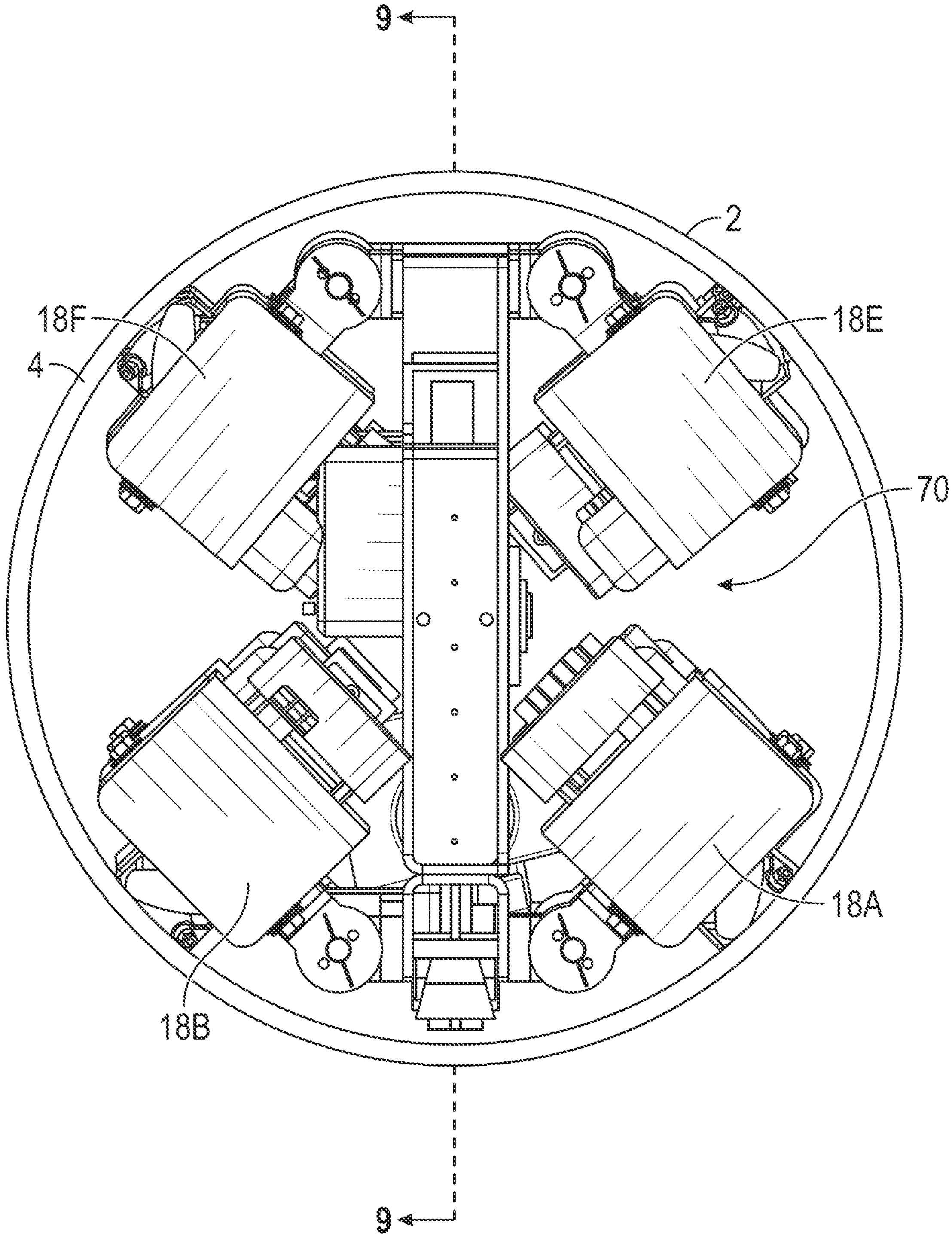
FIG. 8 is a front-end view.
Figure 9:
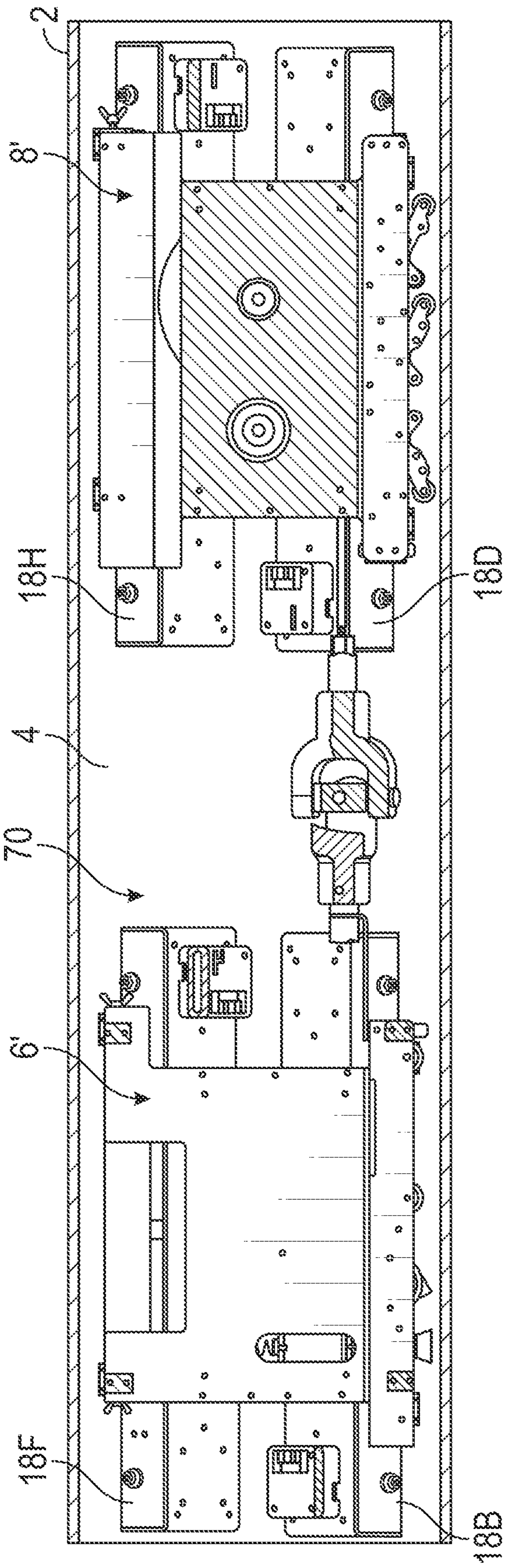
FIG. 9 is a cross-sectional view of a cable deployment tool according to an alternative, exemplary embodiment of the disclosed concept.

FIG. 8 is a front-end view and FIG. 9 is a cross-sectional view taken along lines 9-9 in FIG. 8 of a cable deployment tool 70 according to an alternative, exemplary embodiment of the disclosed concept as deployed during operation within an exemplary pipeline 2 having a pipe wall 4. Cable deployment tool 70 is similar to cable deployment tool 1 described herein, with like reference numeral indicating like elements. Cable deployment tool 70 differs from cable deployment tool 1, however, in that it includes a modified fiber unit 6' and a modified tape unit 8'. As seen in FIGS. 8 and 9, modified fiber unit 6' and modified tape unit 8' each include four drive units 18 as described herein (as opposed to just two drive units 18 in each of fiber unit 6 and a tape unit 8). In other respects, modified fiber unit 6' and modified tape unit 8' are similar to fiber unit 6 and a tape unit 8 described herein. The additional drive units 18 in this alternative embodiment provide cable deployment tool 70 with increased maneuverability as cable deployment tool 70 is moved along the length of pipeline 2 in a number of various manners, including being moved axially and/or helically. For example, the cable deployment tool as described herein can be programmed to divert around service laterals, tees, intrusions (temp probes etc.) or other potential anomalies in a pipe.

In the non-limiting exemplary embodiments just described, the securing material component is an adhesive tape 14 that is dispended from the tape unit 8. It will be understood, however, that other securing materials may be used in addition to or even instead of the adhesive tape 14 to secure cable to the inner surface of pipe wall 4. Such additional materials may include various adhesives, such as a resin (e.g., a UV curable resin), two component fast set adhesives, like epoxies, polyurethanes, urethanes or polyureas. The drawback to all of these alternatives is that a fluid hose umbilical would need to be added into the system to provide it with these components for installations where there will not be a subsequent coating applied over the top of the fiber. It is, however, possible to put in-line tanks as a train attachment to the cable deployment tool to provide these fluids. The cable deployment tool would then put a small spot of this adhesive (e.g., as a slurry) every 2-3 feet simply to hold the optical fiber in place until a full circumferential coating is applied as described elsewhere herein. In any of these alternative, the adhesive would be dispensed from a suitable material dispensing assembly provided as part of tape unit 8 or as part of a separate dispending assembly (which may or may not be coupled to tape unit 8). The material dispensing assembly may include any suitable mechanism for holding and selectively dispensing/depositing the additional material, such as a spray-based or injection-based deposition mechanism for depositing the material using a spray-based or injection-based deposition method. In one particular implementation of this embodiment, the disclosed concept includes an immediate application of an anti-corrosion and/or abrasion resistant epoxy, urethane or polyurethane to cover the deposited fiber 12 and the tape 14 so that IL inspections, abrasive pigging, camera inspection, etc. can be done post fiber installation without damaging the tape or the optical fiber. In another particular implementation, the disclosed concept may include a multi-stage affixing/embedding process such as disposition of a UV curable resin followed by an overlay of a metallic tape or a UV curable resin followed by a metal or polymer spray embedding process.

Figure 10:
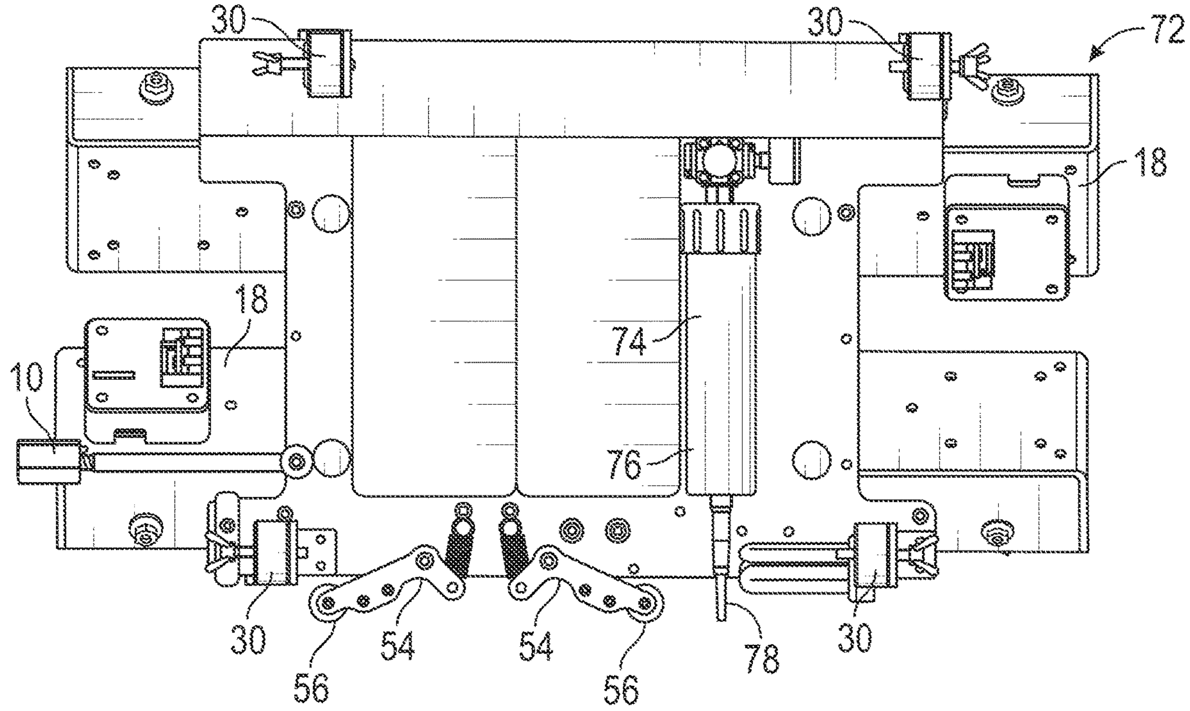
FIG. 10 is a cross-sectional view of a resin unit according to a further alternative exemplary embodiment of the disclosed concept.

FIG. 10 is a cross-sectional view of a resin unit 72 according to a further alternative exemplary embodiment of the disclosed concept. Resin unit 72 is similar to tape unit 8 described elsewhere herein, and like components are labeled with like reference numerals. Like the embodiments shown in FIGS. 8 and 9, resin unit 72 includes four drive units 18 (only two are shown in FIG. 10, which is a cross-sectional view) for forming part of the drive assembly. In addition, resin unit 72 differs from tape unit 8 in that, instead of having a tape holder/spool 48 and a release liner spool/collector 52, resin unit 72 includes a resin dispensing unit 74 having a reservoir for holding a resin, such as a UV-curing resin) and a nozzle 78 for dispensing the resin. Resin unit 72 is structured to be coupled a fiber unit as described herein in various embodiments so that it can dispense the resin onto the fiber optic cable 12 after it is deployed onto a pipeline as described herein. For example, the resin may be dispensed by an internal and controllable pump or be gravity fed depending on the application. As will be appreciated, a small controllable pump would be needed for applications that were not in the invert of the pipe where gravity feed and a flow control would be used.

In still another alternative exemplary embodiment, the disclosed concept may be employed in sensor installs in a groove or indentation provided in the pipe (e.g., a concrete or steel pipe). In such an embodiment, a drill bit, such as a miniature carbide router bit, or similar tool would be inserted into and or otherwise coupled to high-speed cleaner motor 34 that drives wire brush 32. The bit would then be used to route a small "V" shaped groove or indentation in the concrete pipe. The fiber-optic cable 12 would then be placed in the bottom of the cut as described herein. The "V" shaped indentation or groove would then be filled in with a bead of fast set epoxy (or some other adhesive such as a UV curable resin) fed from an automatic dispensing module such as resin unit 72. In one particular implementation that, UV cured resin is deposited over fast set epoxy due to its nearly immediate curing when exposed to the correct UV lights. These alternative exemplary embodiments may be particularly useful in many applications, as it solves many of the post installation concerns as they relate to PHMSA regulated pipelines where cleaning and ILI inspections are required continuously.

This "V-groove" methodology can, in certain non-limiting exemplary embodiments, be accomplished by using a high-speed carbide or diamond tipped cutting tool (like a router or CNC bit). In the exemplary implementation, the bit would only need to be about 0.030"-0.050" wide at its widest point at the top and about 0.030" in depth/length down to the point of the bit. This bit would be conically shaped to make a "V" groove in the steel, plastic, concrete or fiberglass pipe. The reason for the "V" shape is to reduce the amount of material the process needs to remove for speed, battery consumption etc., as well as to reduce the amount of resin needed to encapsulate and secure the fiber in the groove. In one particular embodiment, a mini-high speed motor for the cutting tool would be mounted in an actuator fixture that is controlled by a proximity sensor, such as an (LiDAR) or similar, to assure proper depth of cut. The optic fiber would then be immediately laid into this groove by the cable deployment tool, and then the groove is immediately filled with an adhesive, such as a fast set clear epoxy or resin or a single component UV cured gel, as described herein to encapsulate and secure the optic fiber while the surface of the embedment material (clear epoxy, UV gel, etc.) remains flush or just below the surface of the pipe ID surface. With this methodology, the optical fiber does not impede future cleaning and or ILI inspection tools and or other inspection devices and it eliminates the potential for the optical fiber or the tape from being dislodged by these processes. Additionally, it keeps it out of the media flow or from contacting the media for pipelines with aggressive, corrosive, or abrasive medias With this methodology, the fiber also does not protrude into the ID of the pipe for applications where HDPE or CIPP or other type of liner system are being pulled through the pipe as the rehab method after the FODT has completed its installation.

In the exemplary embodiment, the fiber is aligned to make sure that it is laid into the groove, as there is some distance between the fiber spool and where it is placed in the "V" groove. Misalignment of the tool could cause the path of the fiber to deviate from the groove. Computer vision and/or a small alignment probe that rides in the groove just prior to the fiber being encapsulated in the UV gel may be employed to ensure proper alignment. This would make sure than the optical fiber, and more importantly a series of guides aligning the fiber into the groove, are consistently orienting the fiber into the groove prior to resin injection.

Figure 11:
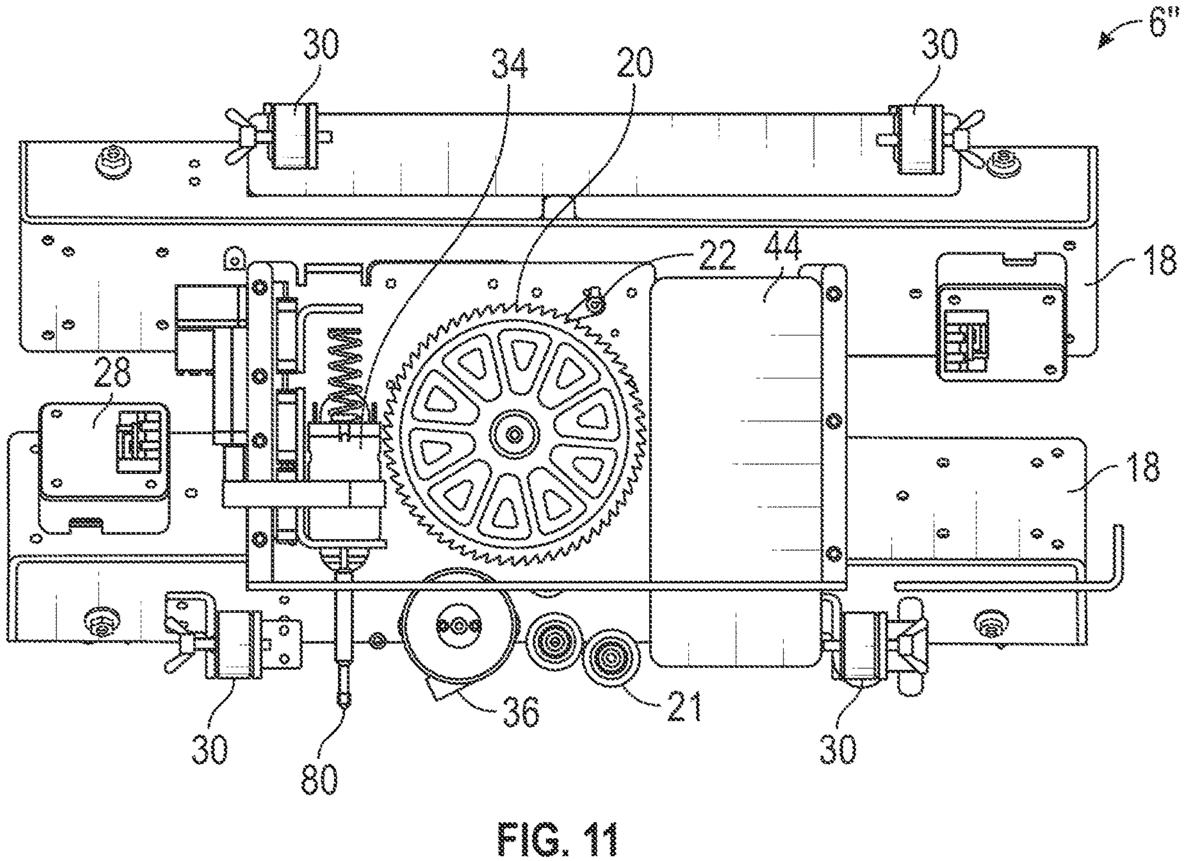
FIG. 11 is a cross-sectional view of a modified fiber unit according to another non-limiting exemplary embodiment of the disclosed concept.

FIG. 11 is a cross-sectional view of a modified fiber unit 6" according to one particular, non-limiting implementation of this exemplary embodiment. As seen in FIG. 11, modified fiber unit 6' is similar to fiber unit 6 and modified fiber unit 6', and like components are labelled with like reference numerals. However, modified fiber unit 6" differs from fiber unit 6' in that it includes a drill bit 80 in place of brush 34 for purposes of cutting the "V" shaped indentation or groove as discussed above. As seen, this embodiment still includes at least one blower 36 (or possibly more than one) for removing cutting debris. Also, the distance between the routing/cutting groove and fiber placement will, in the exemplary embodiment, be wide enough to allow any residual heat in the substrate from cutting to dissipate prior to fiber and adhesive (e.g., UV resin) placement.

Figure 12:
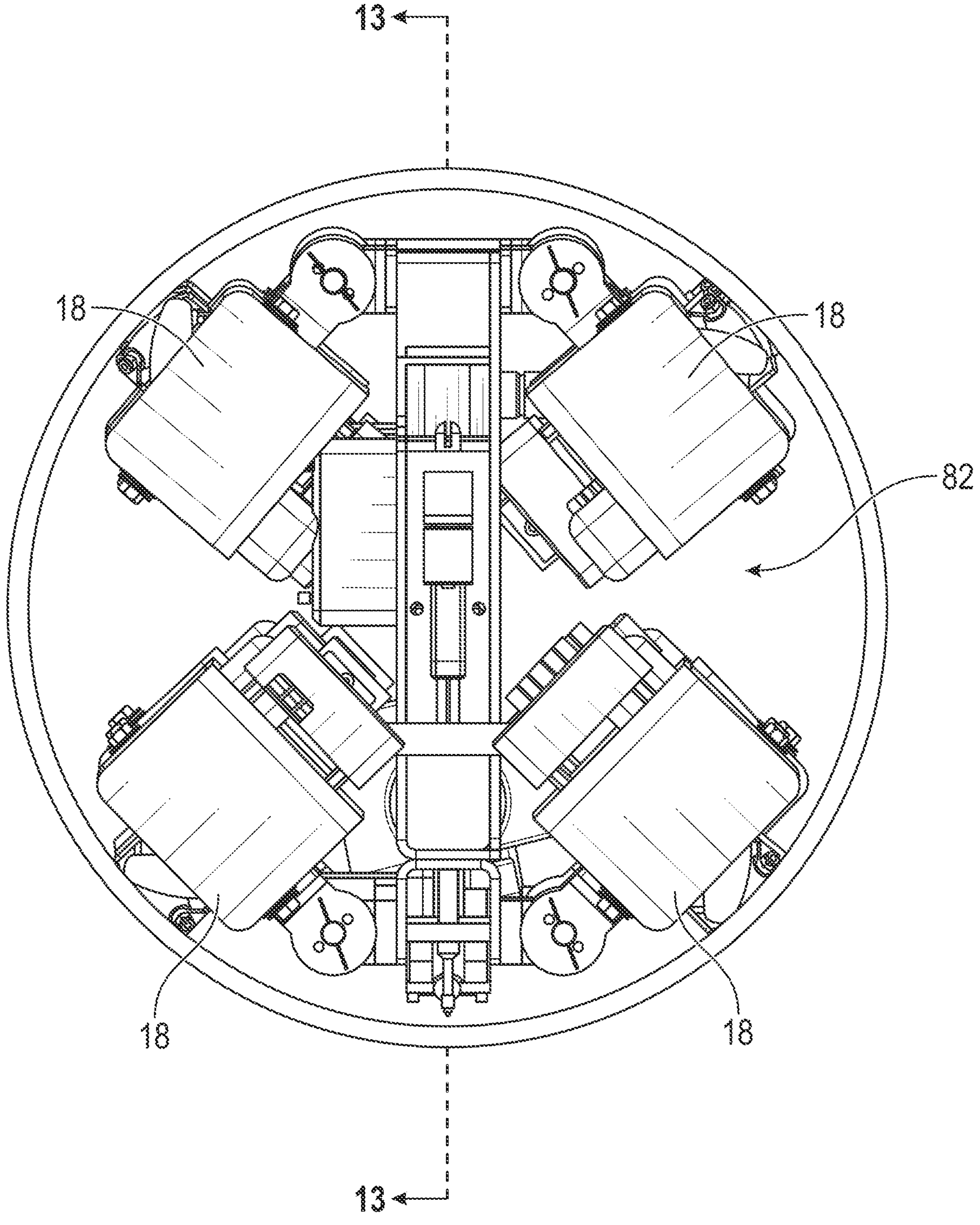
FIG. 12 is a front-end view and FIG. 13 is a cross-sectional view of a cable deployment tool according to a further alternative, exemplary embodiment of the disclosed concept.
Figure 13:
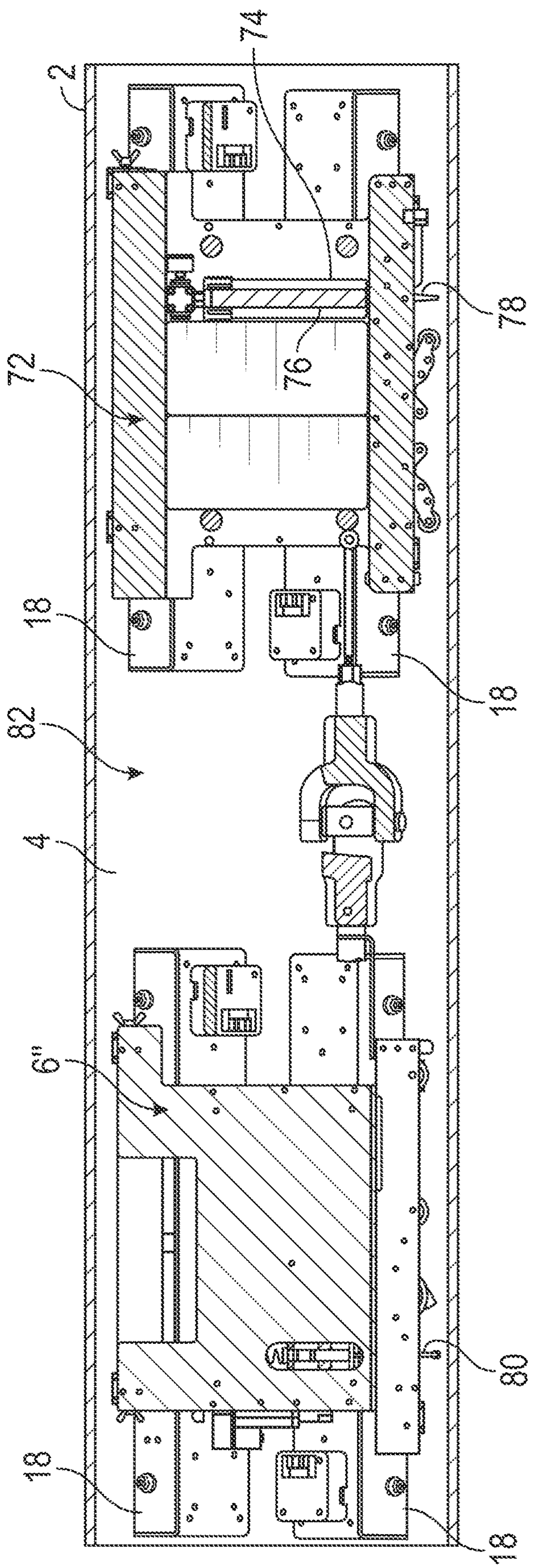

In addition, FIG. 12 is a front-end view and FIG. 13 is a cross-sectional view taken along lines 13-13 in FIG. 12 of a cable deployment tool 82 according to still another alternative, exemplary embodiment of the disclosed concept as deployed during operation within an exemplary pipeline 2 having a pipe wall 4. Cable deployment tool 82 includes a modified fiber unit 6' and a resin unit 72. Modified fiber unit 6' and resin unit 72 each in the exemplary embodiment include four drive units 18 as described herein. Cable deployment tool 82 is particularly well suited for implementing the "v" shaped indentation or groove embodiment just described.

In still other embodiments, the cable deployment tool as described herein in various embodiments may include a first scoring tool assembly positioned at 90 degrees and a second scoring tool assembly affixed in the tool at 270 degrees to allow for the installation of two optical fibers simultaneously. This would allow for more accurate and comparative data from the pipe. Additionally, with the elevated installation speed of the cable deployment tool, multiple optical fiber wires can be installed in the pipe expeditiously while the pipe access is open by embedding one optical fiber and then loading another and installing it in another run at another orientation. In the exemplary embodiment, the tool has the capability to place and align several "V" groove tools (motors, actuators and rotary bits) in-line so that each bit can incrementally remove a smaller portion of the pipe (e.g., steel) rather than having one bit remove all of it. This would increase the material removal and cable deposition rate of the tool, especially in hard substrates like new specialty alloy pipes or old cast iron, etc., as well as increasing the life of the bits. A rotating abrasive wheel may also be used for cutting the groove in the pipe. It should be further noted that the cable deployment tool as described herein in various embodiments is compartmentalized so the length thereof can be adjusted by adding or removing a so that the tool can traverse through bends in the pipe Moreover, it will be understood that the fiber and tape and/or other adhesive installation according to the various aspects and embodiments of the disclosed concept may be performed on new pipelines and/or on existing pipelines that have undergone or are undergoing some type of refurbishment or rehabilitation process, such as a lining process which applies one or more lining layers to the insides of the pipeline. In such an implementation, the spraying/lining apparatus could be positioned just forward and connected to the cable deployment tool 1 so that immediately following fiber and possibly tape) embedment as described herein, a coating of the additional adhesive materials can be applied over the fiber (and possibly the deposited tape). This would be applicable for any of a number of lining methodologies, such as, without limitation, spray-in-place-pipe (SIPP), epoxy/urethane linings spray-in-place-pipe (CIPP), high-density polyurethane (HDPE) slip lining, steel can slip lining, fiberglass reinforced plastic (FRP), carbon-fiber reinforced plastic (CFRP), Cement Mortar, Geocrete, Hobas and other pipe rehab methods. In certain implementations, (e.g., CIPP, HDPE, Spiral Wound, etc.), the fiber would be embedded by the cable deployment tool 1 on the crown of the pipe ID instead of the invert, as these systems are pulled into the host pipe and would tear the fiber off the pipe during installation if not installed at the crown there would be no interference Thus, in this implementation, a cable deployment tool as described herein in the various embodiments would be used to secure a fiber immediately preceding the installation of a liner or similar material as described.

Furthermore, in the non-limiting exemplary embodiments described herein, brush 32 (static or rotating) and blower 36 are used to clean the surface to which the fiber cable is to be secured, it will be understood that other cleaning methods are also contemplated within the scope of the disclosed concept. For example, and without limitation, the following may also be used for cleaning, alone or in any combination (including in combination with a brush or blower): abrasive fixtures (to both remove debris and roughen surface for improved adhesion), UV illumination (to remove organics on the surface for improved adhesion), or UV illumination (to remove organics on the surface for improved adhesion).

It is even contemplated that is some implementations, cleaning with a cable deployment tool before securing a fiber as described herein may not be needed. For example, if the installation of the optical fiber with the metal tape embedding material as described herein is going to be done just prior to or during the application of any spray on coating, cold spray, or any other method for rehabilitating the pipe, the pipe in its entirety would be cleaned prior to the installation of the fiber optic sensor. As a result, the cable deployment tool would not need to clean a path for the optical fiber/metal tape. The cleaning of the pipe in its entirety as just described would instead be done by any of the following techniques, alone or in combination: abrasive pigging, (medium to high density foam pig with abrasive and or wire brushes affixed to the outside of it—winched or pneumatically pushed/pulled through pipe), remote rotary abrasive blasting (small remote blasting apparatus that centrifugally cast abrasive against pipe wall—sand or other abrasive—and is pulled through pipe), HVLP abrasive cleaning (injecting abrasive into high volume—low pressure air flow through pipe), drag scraping (metal Christmas tree shaped device with scraping blades that is winched through pipe), or chain knocking (remote pneumatic tool that spins short pieces of chain and is pulled through pipe). Potentially, such cleaning may also utilize remote high-pressure water blasting or hydra-lasing wherein a rotating nozzle is pulled through pipe and cleans by a fluid driven spinner with small orifices that waterblast the surface clean. It should be noted, however, that an issue with this type of cleaning is that the pipe then must be pigged with foam swabbing pigs or rubber cup batching pigs, to pull out standing water and then air dried prior to applying any coating.

Thus, the cable deployment tool of the disclosed concept, as described herein in connection with the various particular exemplary embodiments, comprises a self-propelled and automatically and remotely controlled cable deployment device that (i) is adjustable to different pipe diameters, (ii) includes self-contained material storage for both the cable and the materials necessary to secure the cable, (iii) in some embodiments, cleans the surface to which the cable is to be secured, and (iv) automatically deposits the cable onto the cleaned surface and secures the cable in place for operation.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An apparatus for installing a cable within a tubular structure, comprising:

a drive assembly structured and configured to move the apparatus along a length of the tubular structure;

a cable assembly coupled to the drive assembly, the cable assembly being structured and configured to hold the cable, wherein the apparatus is structured and configured to dispense the cable from the apparatus and onto and/or into and along an inner surface of the tubular structure while the apparatus is being moved along the length of the tubular structure; and a securing assembly coupled to the drive assembly, the securing assembly being structured and configured to hold a securing material component, wherein the apparatus is structured and configured to dispense the securing material component from the apparatus while the apparatus is being moved along the length of the tubular structure, and wherein the securing material component is structured and configured to secure the cable to the inner surface of the tubular structure after being dispensed from the apparatus.

2. The apparatus according to claim 1, further comprising a cleaning assembly coupled to the cable assembly and the securing assembly, the cleaning assembly being structured and configured to clean portions of the inner surface of the tubular structure while the apparatus is being moved along the length of the tubular structure and before the cable is dispensed onto and/or into the portions of the inner surface of the tubular structure.

3. The apparatus according to claim 1, wherein the cable comprises a fiber optic cable having one or more sensors associated therewith.

4. The apparatus according to claim 1, wherein the securing assembly comprises a tape assembly and wherein the securing material component comprises an adhesive tape.

5. The apparatus according to claim 4, wherein the adhesive tape is a metallic tape, a filament reinforced tape, or a resin impregnated tape.

6. The apparatus according to claim 1, wherein the securing assembly comprises a dispensing unit having a reservoir for holding the securing material component and a nozzle for dispensing securing material component.

7. The apparatus according to claim 6, wherein the securing material component comprises a UV curable resin, and epoxy, a polyurethane, a urethane or a polyurea.

8. The apparatus according to claim 1, wherein the drive assembly is structured and configured to move the apparatus axially along the length of the tubular structure while the cable and the securing material component are being dispensed from the apparatus.

9. The apparatus according to claim 1, wherein the drive assembly is structured and configured to move the apparatus helically along the length of the tubular structure while the cable and the securing material component are being dispensed from the apparatus.

10. The apparatus according to claim 1, wherein the drive assembly comprises a plurality of drive units coupled to the cable assembly and the securing assembly, and wherein each drive unit comprises a number of wheel assemblies each coupled to an associated motor.

11. The apparatus according to claim 10, wherein each wheel assembly comprises a Mecanum wheel.

12. The apparatus according to claim 10, wherein each drive unit further comprises a motor driver coupled to the wheel assembly and the associated motor.

13. The apparatus according to claim 12, further comprising a controller coupled to and structured to control operation of the cable assembly, the securing assembly and the drive assembly, wherein each of the motor drivers is independently controllable by the controller.

14. The apparatus according to claim 10, wherein each drive unit is directly coupled to at least one of the cable assembly and the securing assembly by an adjustable bracket.

15. The apparatus according to claim 14, wherein each adjustable bracket comprises a Hirth joint.

16. The apparatus according to claim 1, wherein the drive assembly is selectively adjustable to accommodate and engage a range of inner tubular structure diameters.

17. The apparatus according to claim 2, wherein the cleaning assembly includes an abrading member for abrading material from the portions of the inner surface of the tubular structure while the apparatus is being moved along the length of the tubular structure.

18. The apparatus according to claim 17, wherein the abrading member comprises a brush driven by a motor.

19. The apparatus according to claim 2, wherein the cleaning assembly includes a blower structured and configured to generate a flow of gas, such as air, for clearing material from the portions of the inner surface of the tubular structure while the apparatus is being moved along the length of the tubular structure.

20. The apparatus according to claim 2, wherein the cleaning assembly includes: (i) an abrading member for abrading material from the portions of the inner surface of the tubular structure while the apparatus is being moved along the length of the tubular structure, and (ii) a blower structured and configured to generate a flow of gas, such as air, for clearing the abraded material from the portions of the inner surface of the tubular structure while the apparatus is being moved along the length of the tubular structure.

21. The apparatus according to claim 1, further comprising a drilling assembly coupled to the cable assembly and the securing assembly that includes a tool for routing an indentation for receiving the cable in the tubular structure while the apparatus is being moved along the length of the tubular structure.

22. The apparatus according to claim 21, wherein the securing assembly includes a module for holding and depositing an adhesive material into the indentation and on at least the cable while the apparatus is being moved along the length of the tubular structure.

23. The apparatus according to claim 22, wherein the securing material component comprises an epoxy, a resin, a urethane, a polyurethane or a polyurea.

24. The apparatus according to claim 23, wherein the securing material component is a UV cured gel.

25. The apparatus according to claim 22, wherein the securing material component is a corrosion and/or abrasion resistant material.

26. The apparatus according to claim 21, wherein the indentation is a V-shape indentation and wherein the tool is structured to create the V-shaped indentation.

27. The apparatus according to claim 26, wherein the tool is a conically shaped drill bit.

28. The apparatus according to claim 26, wherein the drilling assembly is structured and configured to create the V-shaped indentation having depth such that the fiber and the securing material component will remain flush or just below a surface of the tubular structure.

29. The apparatus according to claim 1, wherein the cable assembly is part of a cable unit, wherein the securing assembly is part of a securing unit, wherein the cable unit is separate and distinct from the securing unit, and wherein a rear end of the cable unit is removably coupled to a front end of the securing unit.

30. The apparatus according to claim 29, wherein the securing unit is structured and configured to receive the cable from the cable unit and dispense the received cable from the securing unit and onto and/or into and along an inner surface of the tubular structure while the apparatus is being moved along the length of the tubular structure.

31. The apparatus according to claim 30, wherein the securing unit is structured and configured to dispense the securing material component from the securing unit while the apparatus is being moved along the length of the tubular structure.

32. The apparatus according to claim 30, wherein the drive assembly includes a number of first drive units coupled to the cable unit and a number of second drive units coupled to the securing unit.

33. The apparatus according to claim 32, wherein each drive unit comprises a number of wheel assemblies each coupled to an associated motor.

34. The apparatus according to claim 33, wherein each wheel assembly comprises a Mecanum wheel.

35. The apparatus according to claim 32, wherein the number of first drive units is adjustably coupled to the cable unit and the number of second drive units is adjustably coupled to the securing unit to enable the apparatus to accommodate and engage a range of inner tubular structure diameters.

36. The apparatus according to claim 29, wherein the cleaning assembly is part of the cable unit and includes: (i) an abrading member for abrading material from the portions of the inner surface of the tubular structure while the apparatus is being moved along the length of the tubular structure, and (ii) a blower structured and configured to generate a flow of gas, such as air, for clearing the abraded material from the portions of the inner surface of the tubular structure while the apparatus is being moved along the length of the tubular structure.

37. The apparatus according to claim 1, wherein the cable assembly is part of a cable unit, wherein the cable unit further includes a cleaning assembly structured and configured to clean portions of the inner surface of the tubular structure while the apparatus is being moved along the length of the tubular structure and before the cable is dispensed onto and/or into the portions of the inner surface of the tubular structure, wherein the securing assembly is part of a securing unit and includes a tape assembly and wherein the securing material component comprises an adhesive tape, wherein the cable unit is separate and distinct from the securing unit, and wherein a rear end of the cable unit is removably coupled to a front end of the securing unit.

38. The apparatus according to claim 1, wherein the cable assembly is part of a cable unit, wherein the cable unit further includes a drilling assembly that includes a tool for routing an indentation for receiving the cable in the tubular structure while the apparatus is being moved along the length of the tubular structure, wherein the securing assembly includes a module including a reservoir and a nozzle for holding and depositing an adhesive material into the indentation and on at least the cable while the apparatus is being moved along the length of the tubular structure, wherein the cable unit is separate and distinct from the securing unit, and wherein a rear end of the cable unit is removably coupled to a front end of the securing unit.

39. The apparatus according to claim 1, wherein the tubular structure is a pipeline.

40. The apparatus according to claim 1, wherein the cable assembly includes a first housing member including a fiber spool for holding the cable, wherein the apparatus is structured and configured to dispense the cable from the first housing member, wherein the securing assembly includes a second housing member structured and configured to hold the securing material component, wherein the apparatus is structured and configured to dispense the securing material component from the second housing member, wherein the drive assembly is structured and configured to move the apparatus axially and/or helically along the length of the tubular structure while the cable and the securing material component are being dispensed from the apparatus, wherein the drive assembly comprises a first drive unit including a first drive unit housing member holding a number of first Mecanum wheel assemblies coupled to a first motor and a first motor driver, the first drive unit housing member being coupled to a first side of the first housing member by first adjustable brackets that allow the first drive unit housing member to be selectively pivoted with respect to the first housing member, a second drive unit including a second drive unit housing member holding a number of second Mecanum wheel assemblies coupled to a second motor and a second motor driver, the second drive unit housing member being coupled to the a second side of the first housing member by second adjustable brackets that allow the second drive unit housing member to be selectively pivoted with respect to the first housing member, a third drive unit including a third drive unit housing member holding a number of third Mecanum wheel assemblies coupled to a third motor and a third motor driver, the third drive unit housing member being coupled to a first side of the second housing member by third adjustable brackets that allow the third drive unit housing member to be selectively pivoted with respect to the second housing member, and a fourth drive unit including a fourth drive unit housing member holding a number of fourth Mecanum wheel assemblies coupled to a fourth motor and a fourth motor driver, the fourth drive unit housing member being coupled to a second side of the second housing member by fourth adjustable brackets that allow the fourth drive unit housing member to be selectively pivoted with respect to the second housing member.

* * * * *